United States Patent [19]

Koide et al.

[11] Patent Number: 5,045,626

[45] Date of Patent: Sep. 3, 1991

[54] AROMATIC COPOLYESTER

[75] Inventors: Shinichi Koide; Toshiaki Suzuki; Hiroshi Takeshita, all of Tokyo, Japan

[73] Assignee: Showa Shell Sekiyu Kabushiki Kaisha, Tokyo, Japan

[21] Appl. No.: 543,399

[22] Filed: Jun. 26, 1990

[51] Int. Cl.$^5$ .................... C08G 8/02; C08G 75/00; C08G 63/02; C08G 63/18

[52] U.S. Cl. .................................. 528/193; 528/125; 528/171; 528/176; 528/190; 528/194

[58] Field of Search ............... 528/125, 171, 176, 190, 528/193, 194

[56] References Cited

U.S. PATENT DOCUMENTS

| | | | |
|---|---|---|---|
| 3,133,898 | 5/1964 | Keck | 528/193 |
| 3,293,223 | 12/1966 | Duling | 528/176 |
| 3,933,713 | 1/1976 | Sokolov et al. | 528/176 |
| 3,996,201 | 12/1976 | Buxbaum | 528/176 |

FOREIGN PATENT DOCUMENTS

| | | |
|---|---|---|
| 2453448 | 5/1975 | Fed. Rep. of Germany . |
| 2376501 | 7/1978 | France . |
| 49-15066 | 4/1974 | Japan . |
| 50-4146 | 1/1975 | Japan . |
| 50-31918 | 10/1975 | Japan . |
| 52-59653 | 5/1977 | Japan . |
| 55-15491 | 4/1980 | Japan . |
| 0185319 | 11/1982 | Japan . |
| 2039620 | 2/1987 | Japan . |
| 1-029427 | 1/1989 | Japan . |
| 1399616 | 7/1975 | United Kingdom . |

OTHER PUBLICATIONS

Chemical Abstracts—vol. 79, No. 14—Abstract No. 79503d (Oct. 8, 1973).

Primary Examiner—Harold D. Anderson
Assistant Examiner—T. Mosley
Attorney, Agent, or Firm—Cushman, Darby & Cushman

[57] ABSTRACT

Aromatic copolyesters comprise 10 to 90 mol % of the repeating unit (I) and 90 to 10 mol % of the repeating unit (II):

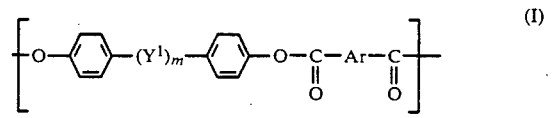

(I)

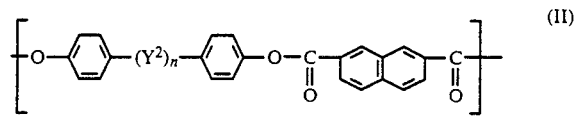

(II)

wherein $Y^1$ and $Y^2$ may be the same or different and are, for example, a lower alkylene group, a lower alkylidene group or a carbonyl group, Ar is, for example, a phenylene group or a naphthylene group, and m or n is zero or one, and the copolyesters have high glass transition temperature, heat resistance, modulus, moulding processability and mechanical strength and are useful for shaped articles in mechanical, electrical or medical applications.

12 Claims, No Drawings

AROMATIC COPOLYESTER

The present invention relates to a novel linear aromatic polyester and a process for preparing the same. More particularly, the novel polyester has, as an aromatic dicarboxylic acid moiety, a combination of 2,7-naphthalene dicarboxylic acid and an aromatic dicarboxylic acid wherein linkage chains extend in one and the same direction or in two directions parallel each other. The polyester has high glass-transition temperature as well as modulus, and is superior in heat resistance, moulding processability and mechanical strength.

There are a large number of linear aromatic polyesters, such as those having bisphenols, hydroquinone or resorcinol as a diol moiety and terephthalic acid, isophtalic acid, 2,6-naphthalenedicarboxylic acid or 2,7-naphthalenedicarboxylic acid as a dicarboxylic acid moiety, and those having p-hydroxybenzoic acid. However, aromatic copolyesters have not yet been proposed, said copolyesters being obtained by polycondensastion between bisphenols, a diol moiety, and a combination of 2,7-naphthalenedicarboxylic acid and aromatic dicarboxylic acids where a linkage chain extends in one and the same direction or in two directions parallel each other.

After extensive research on such aromatic copolyesters as above, the present inventors found that some of them had high glass transition temperature as well as modulus, and were superior in heat resistance, mechanical strength, and molding processability and were soluble in various sorts of solvents. According to the present invention, aromatic copolyesters are provided which comprises 10–90 mol % of the repeating unit of

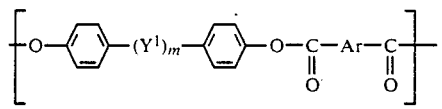

and 90–10 mol % of the repeating unit of

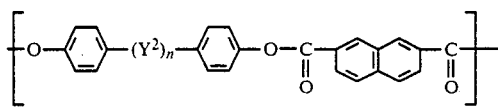

wherein $Y^1$ and $Y^2$ may be the same or different and are selected from a lower alkylene group, a lower alkylidene group, an oxygen atom, a sulfur atom, a carbonyl group and a sulfonyl group, preferably a $C_{2-4}$ alkylidene group and a sulfonyl group; m and n are zero or one; and Ar stands for an aryl group in which linkage chains extend in one and the same direction or in two directions parallel each other, such as a phenylene group, a naphthylene group, a biphenylene group or

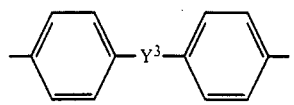

where $Y^3$ may be the same as or different from $Y^1$ or $Y^2$.

The present aromatic copolyester is prepared by polycondensation of at least one of bisphenols of the formula

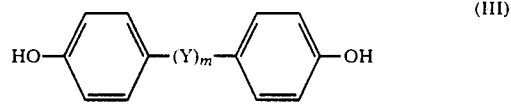

wherein Y is a lower alkylene group, a lower alkylidene group, an oxygen atom, a sulfur atom, a carbonyl group or a sulfonyl group; and m is zero or one, and solution comprising 10–90 mol % of a compound of the formula

wherein Ar is as defined above and 90–10 mol % of 2,7-naphthalenedicarboxylic acid.

The polycondensation may be conducted in a melt polycondensation conventionally known (for instance, JP 50-31918) but preferably in an interfacial polycondensation which is developed by the present inventors, since the product copolyester obtained is less colored and has higher molecular weight.

The lower alkylene group or the lower alkylidene group represented by Y in the formula (III) is straight chain or branched chain one having 1 to 8 carbon atoms, preferably a $C_{1-4}$ alkylene group or alkylidene group, such as methylene, ethylene, ethylidene, trimethylene, propylene, isopropylidene, butylene and hexamethylene.

As bisphenols of the formula (III), mention may be made of bis(4-hydroxyphenyl)methane, 1,1-bis(4-hydroxyphenyl)ethane, 1,2-bis(4-hydroxyphenyl)ethane, 2,2-bis(4-hydroxyphenyl)propane, 2,2-bis(4-hydroxyphenyl) n-butane, 1,1-bis(4-hydroxyphenyl)n-butane, 2,2-bis(4-hydroxyphenyl)pentane, 3,3-bis(4-hydroxyphenyl)pentane, 2,2-(4-hydroxyphenyl)hexane, 1,1-bis(4-hydroxyphenyl) cyclohexane, bis(4-hydroxyphenyl)cyclohexylmethane, 2,4'-dihydroxydiphenylmethane, bis(4-hydroxyphenyl)phenylmethane, bis(4-hydroxyphenyl)diphenylmethane, 2,2-bis(4-hydroxyphenyl)heptane, bis(4-hydroxyphenyl)-4'-methylphenylmethane, 1,4-bis(4-hydroxycumyl)benzene, 1,3-bis(4-hydroxycumyl)benzene, 2,2-bis(4-hydroxyphenyl)hexafluoropropane, 9,9-bis(4-hydroxyphenyl)fluorene, 4,4'-dihydroxy diphenylether, 4,4'-dihydroxy diphenylsulfide, 4,4'-dihydroxy diphenylsulfone, 2,4-dihydroxydiphenylsulfone, 4,4'-dihydroxy diphenylketone, 2,2'-dihydroxydiphenyl.

Among them preferable bisphenols are 1,2-bis(4-hydroxyphenyl)ethane, 2,2-bis(4-hydroxyphenyl)propane, 2,2-bis(4-hydroxyphenyl)n-butane, bis(4-hydroxyphenyl)-4'-methylphenylmethane, 1,4-bis(4-hydroxycumyl)benzene, 2,2-bis(4-hydroxyphenyl)hexafluoropropane, 9,9-bis(4-hydroxyphenyl)fluorene, 4,4'-dihydroxy-diphenylsulfone and 4,4'-dihydroxy diphenyl ketone.

More preferable bisphenols are 2,2-bis(4-hydroxyphenyl)propane, bis(4-hydroxyphenyl)-4'-methylphenylmethane and 1,4-bis(4-hydroxycumyl)benzene.

The bisphenols may be used alone or mixtures thereof.

The group Ar in the formula IV is an aromatic group wherein linkage chains extend in one and the same direction or in two directions parallel each other, preferably a phenylene group or a naphthylene group. The group where linkage chains extend in one and the same direction is preferably a 1,4-phenylene group and the group where linkage chains extend in two directions parallel each other is preferably a 2,6-naphthylene group or a 1,5-naphthylene group, more preferably the 2,6-naphthylene group.

When the symbol Ar is

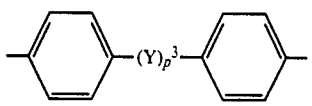

wherein $Y^3$ is preferably a lower alkylene group, a lower alkylidene group, an oxygen atom, a sulfur atom, a carbonyl group or a sulfonyl group, and p is zero or one, more preferably p is zero.

The melt polycondensation technique is conducted by converting the bisphenols to diesters, mixing the diesters with the aromatic dicarboxylic acid and 2,7-naphthalenedicarboxylic acid, and allowing the mixture to react under melting in the presence of an esterification or transesterification catalyst. Alternatively, a mixture of the bisphenols, diaryl 2,6-naphthalenedicarboxylate and diaryl 2,7-naphthalenedicarboxylate is allowed to react under melting in the presence of an esterification or transesterification catalyst. The diesters of bisphenols are, for example, diacetate, propionate or benzoate of the bisphenols. Preferable diaryl esters of the aromatic dicarboxylic acid or 2,7-naphthalene dicarboxylic acid are their diphenyl esters.

The melt polycondensation technique is carried out at a temperature at which the monomers melt, usually 180° C. or higher, preferably at least 250° C. and below the thermal decomposition temperature of the monomers, more preferably, 280°-310° C., under any pressure, preferably reduced pressure. The ester exchange catalysts are titanium compounds such as titanium tetrabutoxide, titanium tetraethoxide or titanyl oxalate. Alternatively, antimony trioxide, zinc acetate or manganese acetate may be used as the catalysts. The catalysts are employed in a catalytic amount, for instance, 0.005 to 1.0 mol %, preferably 0.05 to 0.5 mol %, on the basis of total acid moiety.

The interfacial polycondensation is conducted in such a manner that an aqueous phase, i.e., a solution of at least one of the bisphenols of the formula (III) in an aqueous medium such as water, is brought into contact with an organic phase, i.e., a solution of the aromatic dicarboxylic acid halide of the formula (IV) and 2,7-naphthalenedicarboxylic acid halide in organic solvents which are immiscible with the aqueous medium mentioned above, in the presence of a phase transfer catalyst. Concentration of the bisphenols in the aqueous medium is not critical, but usually is 0.1 to 10 mol/liter, preferably 0.2 to 5 mol/liter. It is desirable for the aqueous phase to have neutralizing agents contained which neutralize hydrogen halide by-produced during the polycondensation. The neutralizing agents are hydroxides, carbonates or hydrogencarbonates of alkali metals or alkaline earth metals, for example, sodium hydroxide, potassium hydroxide, calcium hydroxide, barium hydroxide, sodium carbonate, potassium carbonate and sodium hydrogen-carbonate, preferably sodium hydroxide. These neutralizing agents are present in an amount of 0.5–2 mol/liter preferably 0.9–1.1 mol/liter in the aqueous phase.

The aromatic dicarboxylic acid halides of the formula (IV) and 2,7-naphthalenedicarboxylic acid halides may be present in the forms of chlorides, bromides or fluorides, preferably chlorides. The organic solvents for these acid halides are, for example, halogenated aliphatic hydrocarbons such as dichloromethane, chloroform, 1,2-dichloroethane and sym-tetrachloroethane, or aromatic hydrocarbons such as benzene, toluene, anisol, chlorobenzene, acetophenone, benzonitrile and nitrobenzene, preferably toluene and nitrobenzene. Concentration of the naphthalenedicarboxylic acid halides in the solvents is not critical but usually within the range that total of the aromatic dicarboxylic acid halides of the formula (IV) and 2,7-naphthalenedicarboxylic acid halides is 0.05 to 1 mol/liter, preferably 0.1 to 0.5 mol/liter.

The phase transfer catalysts may be, for example, tetrabutyl-ammonium chloride (TBAC), benzyltriethyl ammonium chloride, benzyl-triphenylsulfonium bromide (CTBPB), 18-crown-6, dibenzo-18-crown-6, dicyclohexyl-18-crown-6, preferably benzyltriethylammonium chloride. The catalysts are employed in an amount of 0 to 4 mol %, preferably 1 to 3 mol % on the basis of total acid chlorides.

The contact between the aqueous phase and the organic phase is usually effected under stirring, at a temperature from ambient temperature to about 100° C., preferably, ambient temperature. under normal pressure for a period of time from about 5 minutes to about 120 minutes. The bisphenols in the aqueous phase (1–1.5 mol) are usually employed to 1 mol of total acid halides in the organic phase.

Ratio of the aromatic dicarboxylic acids of the formula (IV) to 2,7-naphthalenedicarboxylic acid as the acid moiety in the melt polycondensation or interfacial polycondensation may vary depending on properties of the product aromatic copolymers to be obtained. Usual ratio is 10 to 90 mol %, preferably 25 to 80 mol %, more preferably 50 to 75 mol % of the former to 90 to 10 mol %, preferably 75 to 20 mol %, more preferably 50 to 25 mol % of the latter.

In addition to the bisphenols of the formula (III) and the aromatic dicarboxylic acids of the formula (IV) and 2,7-naphthalenedicarboxylic acid, the following compounds may be used together in such a small amount that the present aromatic copolyesters are not substantially degraded, for example not more than 15 mol %. As the diol moiety, mention may be made of ethylene glycol, propylene glycol, butanediol, pentanediol, hexanediol, heptanediol, 2-methyl-1,3-propanediol, neopentyl glycol, 2-ethyl-2-methyl-1,3-propanediol, triethylene glycol and 2,2,4,4-tetramethylcyclobutanediol.

As dicarboxylic acid moiety, mention may be made of isomer of naphtalene dicarboxylic acid except 2,7-naphtalene dicarboxylic acid, terephthalic acid, isophthalic acid, diphenylsulfon dicarboxylic acid, diphenoxyethanedicarboxylic acid, adipic acid, cebacic acid.

As oxycarboxylic acid moiety, mention may be made of p-oxybenzoic acid, m-oxybenzoic acid, 3-chloro-4-oxybenzoic acid, 3-methoxy-4-benzoic acid, 2,6-oxynaphthoic acid and 1,4-oxynaphthoic acid.

The present aromatic polyesters prepared by the processes mentioned above have about 20,000 to 50,000 of molecular weight and high glass transition temperature. The present aromatic polyesters are superior in heat resistance and soluble in various sorts of organic solvents. The polyesters have also good moulding processability and high mechanical strength and modulus. The present polyesters are used in wide technical fields such as electric, mechanical or medical applications, automobiles, films, fibers, paints or adhesives.

The present aromatic polyesters may be incorporated, if desired, with reinforcing materials such as glass fibers, carbon fibers or asbestos, fillers, nuclear agents, flame retardants, pigments, oxidation inhibitors, heat stabilizers, ultraviolet ray absorbers, anticoloring agents, plasticizers, lubricants or mold-releasing agents. The present polyesters may be blended, if desired, with thermoplastic resins.

The present invention is explained in more detail by examples.

Measurement of properties of the polyesters is conducted as follows.

Viscosity $\eta$ inh.

A solution (10 ml) of polymer (0.1 g) in phenol/tetrachloroethane (50/50, 20 ml) in Ostwald viscosimeter is put in a thermostat (30° C.) and falling time (t) is measured. A blank test is conducted in the same manner as above to have falling time ($t_o$), i.e., using only the same solvent as above without the polymer. Inherent viscosity ($\eta$ inh) is calculated by the formula:

$$\eta \text{ inh} = \ln (t/t_o)/0.5$$

Note: Viscosimeter should be controlled, as standard, to have $t_o = 120$ sec.

Glass transition temperature (Tg) and melting point (Tm)

Differential scanning calorimeter ("DSC-20" manufactured by Seiko Denshi Kogyo K.K.) is used. Polymer (about 10 mg) is taken by use of a pan made of aluminium and is heated in a nitrogen atmosphere from 50° C. to 400° C. under rate of 10° C. up/min in order to measure Tg: the first inflection point, and
Tm: endothermia peak.

Heat decomposition temperature

A differential callorimetry thermogravimetric assaying apparatus ("Tg/DTA-20", manufactured by Seiko Denshi Kogyo K.K.) is employed. Polymer (about 10 mg) is taken by use of a pan made of platinum and is heated in an air stream with 10° C. up/min. in order to measure a temperature where 10 % decrease in weight appears.

Softening temperature

A thermomechanical assaying apparatus ("TMA-40" manufactured by Shimidzu Seisakusho) is employed. A needle made of quarts glass (0.5 mm diameter) is put on a specimen (about 50 $\mu$m thick) under 5 g of load. The specimen is heated in a nitrogen atmosphere with rate of 10° C. up/min. in order to measure a temperature where the needle begins to sink.

Solubility

In a solvent to be tested in a test tube is added polymer (1-3 % by weight), and the tube is left to stand for 24 hours to observe whether the polymer dissolves. Then, the test tube where some polymer seems to be left undissolved is heated and cooled. We evaluate that polymer is soluble when no polymer is precipitated after the tube is cooled.

Tensile strength, elongation and tensile modulus

The test is conducted according to ASTM D-822-83 by use of an apparatus ("RTM-25 rtm" manufactured by Toyo Bouldwin Co.).

Both ends (10 mm long each) of a film specimen (120 mm long × 100 mm wide) are sticked on grips with paper so that the specimen does not slide down therefrom. An average thickness is calculated on the basis of those measured at five points of the film. Load (10 kg) is applied with tensile rate of 50 mm/min. on the specimen hold with grips (100 mm long between the grips) in order to record a load-extension curve.

Tensile strength (kgf/mm$^2$) = Akgf*/sectional area (mm$^2$)

Elongation (%) = (L mm − 100 mm)/100 mm *Akgf: maximum load

Both ends (10 mm long each) of another film specimen (270 mm long × 10 mm wide) are sticked on grips with paper. Average thickness is calculated on the basis of those measured at five points. Load (10 kg) is applied with tensile rate of 25 mm/min. on the specimen hold with grips (250 mm long between the grips in order to record a load-extension curve.

Tensile Modulus (kgf/mm$^2$) = Bkgf*·100 mm/Mmm/sectional area mm$^2$

*Bkgf: a load for 1 mm extension at the tangential line of a load-extension curve

EXAMPLE 1

In a solution (20.4 ml) of 1 M sodium hydroxide in water in a three-neck flask equipped with a stirrer, were dissolved 2,2-bis(4-hydroxyphenyl)propane (bisphenol-A) (2.284 g, 10 mmol) and benzyltriethylammonium chloride (0.06 g). To this solution was added at one time under stirring a solution of 2,6-naphthalenedicarbonyl dichloride (1.898 g, 7.5 mmol) and 2,7-naphthalenedicarbonyl dichloride (0.633 g, 2.5 mmol) in nitrobenzene (56 ml). Stirring (800 rpm) was continued at room temperature for 100 minutes.

The solution was left to stand until a solution of polymer in the nitrobenzene was separated. The solution was washed with aqueous acetic acid solution and then with ion-exchanged water. The solution obtained was charged in acetone until polymer was precipitated. The polymer obtained by filtration was washed with water and dried under reduced pressure. A solution of the polymer (3 g) in tetrachloroethane (20 ml) was flowed with a glass rod on a glass plate which had been cleaned. The glass plate hold in the horizontal was dried in a vacuum oven from 12 hours at room temperature, for 12 hours at 80° C. and then for 24 hours at 150° C. until a film was obtained. Inherent viscosity $\eta$ inh, glass transition temperature Tg, softening temperature, heat decomposition temperature and solubility of the polymer and properties of the film are shown in table 1.

EXAMPLE 2

In a solution (20.4 ml) of 1 M sodium hydroxide in water in a three neck flask equipped with a stirrer were dissolved 2,2-bis(4-hydroxyphenyl) propane (bisphenol-A) (2.284 g, 10 mmol) and benzyltriethylammonium chloride (0.06 g). To this solution was added at one time under stirring a solution of 2,6-naphthalenedicarbonyl dichloride (1.265 g, 5 mmol) and 2,7-naphthalenedicarbonyl dichloride (1.265 g, 5 mmol) in nitrobenzene (42 ml). Stirring (800 rpm) was continued for 100 minutes at room temperature.

The solution was left to stand until a solution of polymer in the nitrobenzene was separated. The solution was washed with aqueous acetic acid solution and with ion-exchanged water. The solution was charged in acetone until polymer was precipitated. The polymer obtained by filtration was washed with water and dried under reduced pressure.

A solution of the polymer (3 g) in tetrachloroethane (20 ml) was flowed with a glass rod on a glass plate which had been cleaned. The glass plate hold in the horizontal was dried in a vacuum oven for 12 hours at room temperature, for 12 hours at 80° C. and for 24 hours at 150° C., until a film was obtained. Inherent viscosity η inh, glass transition temperature Tg, softening temperature, heat decomposition temperature and solubility of the polymer and properties of the film are shown in table 1 and tensile strength, elongation and tensile modulus in table 2.

EXAMPLE 3

In a solution (20.4 ml) of 1 M sodium hydroxide in water in a three neck flask equipped with a stirrer were dissolved 2-bis(4-hydroxyphenyl)propane(bisphenol-A) (2.284 g, 10 mmol) and benzyltriethylammonium chloride (0.06 g). To this solution was added at one time under stirring a solution of 2,6-naphthalenedicarbonyl dichloride (0.6338 g, 2.5 mmol) and 2,7-naphthalenedicarbonyl dichloride(1.898 g, 7.5 mmol) in nitrobenzene (35 ml). Stirring (800 rpm) was continued for 100 minutes at room temperature. The solution was left to stand until a solution of polymer in the nitrobenzene was obtained. The solution was washed with aqueous acetic acid solution and with ion-exchanged water and charged in acetone until polymer was precipitated. The polymer obtained by filtration was washed with water and dried under reduced pressure. A solution of the polymer (3 g) in tetrachloroethane (20 ml) was flowed with a glass rod on a glass plate which had been cleaned. The glass plate hold in the horizontal was dried in a vaccum oven for 12 hours at room temperature, for 12 hours at 80° C. and for 24 hours at 150° C. until a film was obtained. Inherent viscosity η inh. glass transition temperature Tg, softening temperature, heat decomposition temperature and solubility of the polymer and properties of the film are shown in table 1.

EXAMPLE 4

In a solution (20.4 ml) of 1 M sodium hydroxide in water in a three neck flask equipped with a stirrer were dissolved 2,2-bis(4-hydroxyphenyl)propane (bisphenol-A) (2.284 g, 10 mmol) and benzyltriethylammonium chloride (0.06 g). To this solution was added at one time under stirring a solution of 2,7-naphthalenedicarbonyl dichloride (1.265 g, 5 mmol) and terephthalic acid chloride (1.016 g, 5 mmol) in nitrobenzene (42 ml). Stirring (800 rpm) was continued for 100 minutes at room temperature. Thereafter, the same procedure as in Example 3 was applied to. Properties of the film prepared from a solution of the polymer obtained (3 g) in tetrachloroethane (20 ml) are shown in tables 1 and 2.

COMPARISON EXAMPLE 1

In a solution (20.4 ml) of 1 M sodium hydroxide in water in a three neck flask equipped with a stirrer were dissolved 2,2-bis(4-hydroxyphenyl)propane(bisphenol-A) (2.284 g, 10 mmol) and benzyltriethylammonium chloride (0.06 g). To this solution was added at one time under stirring a solution of 2,2-naphthalenedicarbonyl dichloride (2.530 g, 10 mmol) in toluene (42 ml), and the mixture was stirred under 800 rpm for 100 minutes at room temperature. The solution was left to stand until a solution of polymer in the toluene was separated. The solution was washed with aqueous acetic acid solution and then ion-exchanged water. The solution was charged in acetone in order to precipitate the polymer which was then recovered by filtration, washed with water and dried under reduced pressure. A solution of the polymer (3 g) in phenol/tetrachloroethane (50/50, 20 ml) was flown with a glass rod on a glass plate which had been cleaned. The glass plate held in the horizontal was dried in a vacuum oven for 12 hours at room temperature, for 12 hours at 80° C., for 12 hours at 150° C. and for 24 hours at 200° C. to prepare a film. Inherent viscosity η inh, glass transition temperature (Tg), softening temperature, heat decomposition temperature and solubility of the polymer and properties of the film are shown in table 1.

COMPARISON EXAMPLE 2

In a solution (20.4 ml) of 1 M sodium hydroxide in water in a three neck flask equipped with a stirrer were dissolved 2,2-bis(4-hydroxyphenyl)propane(bisphenol-A) (2.284 g, 10 mmol) and benzyltriethylammonium chloride (0.06 g). To this solution was added at one time under stirring a solution of 2,7-naphthalenedicarbonyl dichloride (2.530 g, 10 mmol) in nitrobenzene (42 ml), and the mixture was stirred (800 rpm) for 100 minutes at room temperature. The solution was left to stand until a solution of polymer in the nitrobenzene was separated. The solution was washed with aqueous acetic acid solution and then ion-exchanged water. The solution was charged in acetone in order to precipitate the polymer which was then recovered by filtration, washed with water and dried under reduced pressure. A solution of the polymer (3 g) in tetrachloroethane (20 ml) was flown with a glass rod on a glass plate which had been cleaned. The glass plate hold in the horizontal was dried in a vacuum oven for 12 hours at room temperature, for 12 hours at 80° C., for 12 hours at 150° C. and for 24 hours at 200° C. to prepare a film. Inherent viscosity η inh, glass transition temperature (Tg), softening temperature, heat decomposition temperature and solubility of the polymer and properties of the film are shown in table 1.

COMPARISON EXAMPLE 3

In a solution (20.4 ml) of 1 M sodium hydroxide in water in a three neck flask equipped with a stirrer were dissolved 2,2-bis(4-hydroxyphenyl)propane(bisphenol-A) (2.284 g, 10 mmol) and benzyltriethylammonium chloride (0.06 g). To this solution was added at one time under stirring a solution of isophthalic acid chloride (1.016 g, 5 mmol) and terephthalic acid chloride (1.016 g, 5 mmol) in nitrobenzene (42 ml), and the mixture was stirred at 800 rpm for 100 minutes at room temperature. The solution was left to stand until a solution of polymer in the nitrobenzene was separated. The solution was washed with aqueous acetic acid solution and then ion-exchanged water. The solution was charged in acetone in order to precipitate the polymer which was then recovered by filtration, washed with water and dried under reduced pressure. A solution of the polymer (3 g) in tetrachloroethane (20 ml) was flown with a glass rod on a glass plate which had been cleaned. The glass plate hold in the horizontal was dried in a vacuum oven for 12 hours at room temperature, for 12 hours at 80° C., for 24 hours at 150° C. to prepare a film. Inherent viscosity η inh., glass transition temperature (Tg), softening temperature, heat decomposition temperature and solubility of the polymer and properties of the film are shown in table 1. Tensile strength, elongation and tensile modulus are shown in table 2.

wherein $Y^1$ and $Y^2$ are the same or different and are selected from the group consisting of a lower alkylene group, a lower alkylidene group, an oxygen atom, a sulfur atom, a carbonyl group and a sulfonyl group; m and n are zero or one and Ar is an aryl group having linkage chains in one and the same direction or in two directions parallel to each other.

2. Aromatic copolyester according to claim 1

TABLE 1

| | Composition of Acid Chlorides (% by weight)* | | | | Inherent Viscosity | Glass Transition Temperature Tg | Melting Point Tm | Softening Temperature | Heat Decomposition Temperature | Solubility** | Property of the Film |
|---|---|---|---|---|---|---|---|---|---|---|---|
| | 2,6-NDC | 2,7-NDC | IPC | TPC | η inh (dl/g) | (°C.) | (°C.) | (°C.) | (°C.) | | |
| Example | | | | | | | | | | | |
| 1 | 75 | 25 | 0 | 0 | 1.47 | 235 | — | 290 | 440 | A,B,C,K,L,M | Very Tough |
| 2 | 50 | 50 | 0 | 0 | 2.31 | 225 | — | 290 | 430 | A,B,C,D,E,G, H,I,J,K,L,M, N,O,P | Very Tough |
| 3 | 25 | 75 | 0 | 0 | 1.50 | 210 | — | 255 | 440 | A,B,C,D,E,F, G,H,I,J,K,L, M,N,O,P | Very Tough |
| 4 | 0 | 50 | 0 | 50 | 2.05 | 210 | — | — | 440 | A,B,C,D,E,G, H,I,J,K,L,M, N,O,P | Very Tough |
| Comparative Example | | | | | | | | | | | |
| 1 | 100 | 0 | 0 | 0 | 1.72 | — | 308 | 310 | 440 | P | Brittle |
| 2 | 0 | 100 | 0 | 0 | 1.33 | 215 | — | 261 | 430 | A,B,C,J,K,L, M,O,P | Tough |
| 3 | 0 | 0 | 50 | 50 | 0.84 | 176 | — | — | — | — | Very Tough |

Notes
*2,6-NDC = 2,6-naphthalene dicarboxylic acid dichloride
2,7-NDC = 2,7-naphthalene dicarboxylic acid dichloride
IPC = isophthalic acid dichloride
TPC = telephthalic acid dichloride
**A = o-chlorophenol, B = sym-tetrachloroethane,
C = chloroform, D = pyridine, E = 1,2-dichloroethane,
F = anisole, G = o-dichlorobenzene, H = acetophenone,
I = acrylonitrile, J = nitrobenzene, K = phenol,
L = m-cresol, M = N-methylpyrrolidone,
N = dimethylacetoamide, O = THF,
P = phenol/sym-tetrachloroethane (50/50)

TABLE 2

| | Composition of Acid Chloride (% by weight) | | | | Tensile Strength (kgf/mm²) | Elongation (%) | Tensile Modulus (kgf/mm²) |
|---|---|---|---|---|---|---|---|
| | 2,6-NDC | 2,7-NDC | IPC | TPC | | | |
| Example | | | | | | | |
| 1 | 50 | 50 | 0 | 0 | 11 | 70 | 250 |
| 4 | 0 | 50 | 0 | 50 | 9 | 70 | 200 |
| Comparative Example | | | | | | | |
| 3 | 0 | 0 | 50 | 50 | 6 | 70 | 180 |

We claim:

1. Aromatic copolyester comprising 10 to 90 mol % of a repeating unit of

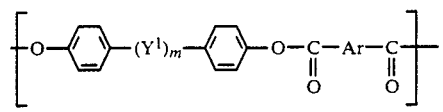

(I)

and 90 to 10 mol % of a repeating unit of

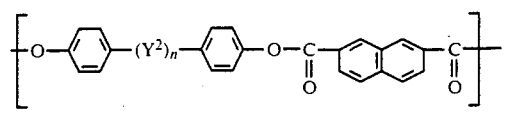

(II)

wherein Ar is a member selected from the group consisting of a 1,4-phenylene group, a 2,6-naphthylene group, a 1,5-naphthylene group and a group having the formula

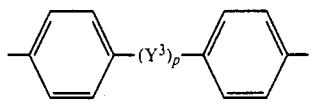

wherein $Y^3$ is a member selected from the group consisting of a lower alkylene group, a lower alkylidene group, an oxygen atom, a sulfur atom, a carbonyl group and a sulfonyl group, and p is zero or one.

3. Aromatic copolyester according to claim 1 wherein Ar is a 2,6-naphthylene group or a 4,4'-biphenylene group.

4. A process for preparing an aromatic copolyester as claimed in claim 1 which comprises contacting a solution of at least one bisphenol compound of the formula (III)

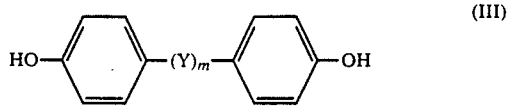

wherein Y is a member selected from the group consisting of a lower alkylene group, a lower alkylidene group, an oxygen atom, a sulfur atom, a carbonyl group and a sulfonyl group, and m is zero or one in an aqueous medium, with a solution of the compounds (a) defined hereinbelow and (b) which is 2,7-naphthalene dicarboxylic acid halide in a ratio of 10 to 90 mol %: 90 to 10 mol % in an organic solvent which is immiscible with the aqueous medium, in the presence of a phase transfer catalyst and polycondensing;

said compound (a) having the formula (IV)

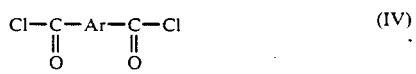

wherein Ar is selected from the group consisting of (i) a phenylene group, a naphthylene group or a biphenylene group having linkaging chains extending in one and the same direction or in two directions parallel to each other, and (ii) a group having the formula

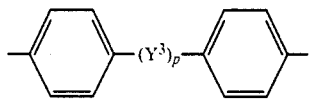

wherein $Y^3$ is selected from the group consisting of a lower alkylene group, a lower alkylidene group, an oxygen atom, a sulfur atom, a carbonyl group or a sulfonyl group, and p is zero or one.

5. A process according to claim 4, wherein the ratio of compound (a) and 2,7-naphthalene dicarboxylic acid halide is 25 to 80 mol %: 75 to 20 mol %.

6. A process according to claim 4, wherein the ratio of compound (a) and 2,7-naphthalenedicarboxylic acid halide is 50 to 75 mol %: 50 to 25 mol %.

7. A process according to claim 4, wherein the bisphenols of formula (III) are selected from the group consisting of bis(4-hydroxyphenyl)methane, 1,1-bis(4-hydroxyphenyl)ethane, 1,2-bis(4-hydroxyphenyl)ethane, 2,2-bis(4-hydroxyphenyl)propane, 2,2-bis(4-hydroxyphenyl)n-butane, 1,1-bis(4-hydroxyphenyl)n-butane, 2,2-bis(4-hydroxyphenyl)pentane, 3,3-bis(4-hydroxyphenyl)pentane, 2,2-(4-hydroxyphenyl)hexane, 1,1-bis(4-hydroxyphenyl)cyclohexane, bis(4-hydroxyphenyl) cyclohexylmethane, 2,4'-dihydroxydiphenylmethane, bis(4-hydroxyphenyl)phenylmethane, bis(4-hydroxyphenyl)diphenylmethane, 2,2-bis(4-hydroxyphenyl)heptane, bis(4-hydroxyphenyl)-4'-methylphenylmethane, 1,4-bis(4-hydroxycumyl)benzene, 1,3-bis(4-hydroxycumyl)benzene, 2,2-bis(4-hydroxyphenyl)hexafluoropropane, 9,9-bis(4-hydroxyphenyl)-fluorene, 4,4'-dihydroxy diphenylether, 4,4'-dihydroxy diphenylsulfide, 4,4'-dihydroxy diphenylsulfone, 2,4-dihydroxydiphenylsulfone, 4,4'-dihydroxy diphenylketone, 2,2'-dihydroxydiphenyl and mixtures thereof.

8. A process according to claim 4, wherein the bisphenols of formula III are selected from the group consisting of 1,2-bis(4-hydroxyphenyl)ethane, 2,2-bis(4-hydroxyphenyl)propane, 2,2-bis(4-hydroxyphenyl)n-butane, bis(4-hydroxyphenyl)-4'-methylphenylmethane, 1,4-bis(4-hydroxycumyl)benzene, 2,2-bis(4-hydroxyphenyl)hexafluoropropane, 9,9-bis(4-hydroxyphenyl)-fluorene, 4,4'-dihydroxy-diphenyl-sulfone, and 4,4'-dihydroxy diphenyl ketone, and mixtures thereof.

9. A process according to claim 4, wherein the bisphenols of formula III are selected from the group consisting of 2,2-bis(4-hydroxyphenyl)propane, bis(4-hydroxyphenyl)-4'-methylphenylmethane, 1,4-bis(4-hydroxycumyl)benzene, and mixtures thereof.

10. A process according to claim 4, wherein in formula (IV) Ar is selected from the group consisting of a 1,4-phenylene group, a 2,6-naphthylene group and a 1,5-naphthylene group.

11. A process according to claim 7, wherein the ratio of compound (a) and 2,7-naphthalene dicarboxylic acid halide is 25 to 80 mol %: 75 to 20 mol %.

12. A process according to claim 11, wherein in formula (IV) Ar is selected from the group consisting of a 1,4-phenylene group, a 2,6-naphthylene group and a 1,5-naphthylene group.

* * * * *